(12) United States Patent
Lafon et al.

(10) Patent No.: US 6,618,652 B2
(45) Date of Patent: Sep. 9, 2003

(54) DEVICE FOR REVIEWING THE FLIGHT PLAN OF AN AIRCRAFT, IN PARTICULAR OF A TRANSPORT PLANE

(75) Inventors: Jean-François Lafon, Toulouse (FR); Daniel Ferro, Muret (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/066,774

(22) Filed: Feb. 6, 2002

(65) Prior Publication Data

US 2002/0120373 A1 Aug. 29, 2002

(30) Foreign Application Priority Data

Feb. 26, 2001 (FR) ............................................. 01 02565

(51) Int. Cl.⁷ .............................................. G06F 17/00
(52) U.S. Cl. ................................ 701/3; 701/4; 244/1 R
(58) Field of Search ................................ 701/3, 1, 4, 9, 701/14, 36; 244/1 R

(56) References Cited

U.S. PATENT DOCUMENTS

| | | | |
|---|---|---|---|
| 4,642,775 A | 2/1987 | Cline et al. | |
| 5,340,061 A | 8/1994 | Vaquier et al. | |
| 5,978,715 A | * 11/1999 | Briffe et al. | 244/158 R |
| 6,005,513 A | * 12/1999 | Hardesty | 342/357.09 |
| 6,057,786 A | * 5/2000 | Briffe et al. | 340/974 |
| 6,112,141 A | * 8/2000 | Briffe et al. | 345/1.3 |
| 6,161,063 A | 12/2000 | Deker | |
| 6,181,987 B1 | 1/2001 | Deker et al. | |
| 6,199,015 B1 | * 3/2001 | Curtwright et al. | 340/990 |
| 6,289,277 B1 | * 9/2001 | Feyereisen et al. | 340/945 |
| 6,314,362 B1 | * 11/2001 | Erzberger et al. | 340/961 |
| 6,353,794 B1 | * 3/2002 | Davis et al. | 340/990 |
| 6,389,355 B1 | * 5/2002 | Gibbs et al. | 434/38 |

FOREIGN PATENT DOCUMENTS

| | | |
|---|---|---|
| CA | 2312559 | 1/2001 |
| FR | 2677149 | 12/1992 |

\* cited by examiner

*Primary Examiner*—William A Cuchlinski, Jr.
*Assistant Examiner*—Olga Hernandez
(74) *Attorney, Agent, or Firm*—Stevens, Davis, Miller & Mosher, LLP

(57) ABSTRACT

Device for reviewing the flight plan of an aircraft, in particular of a transport plane.

Figure 1:
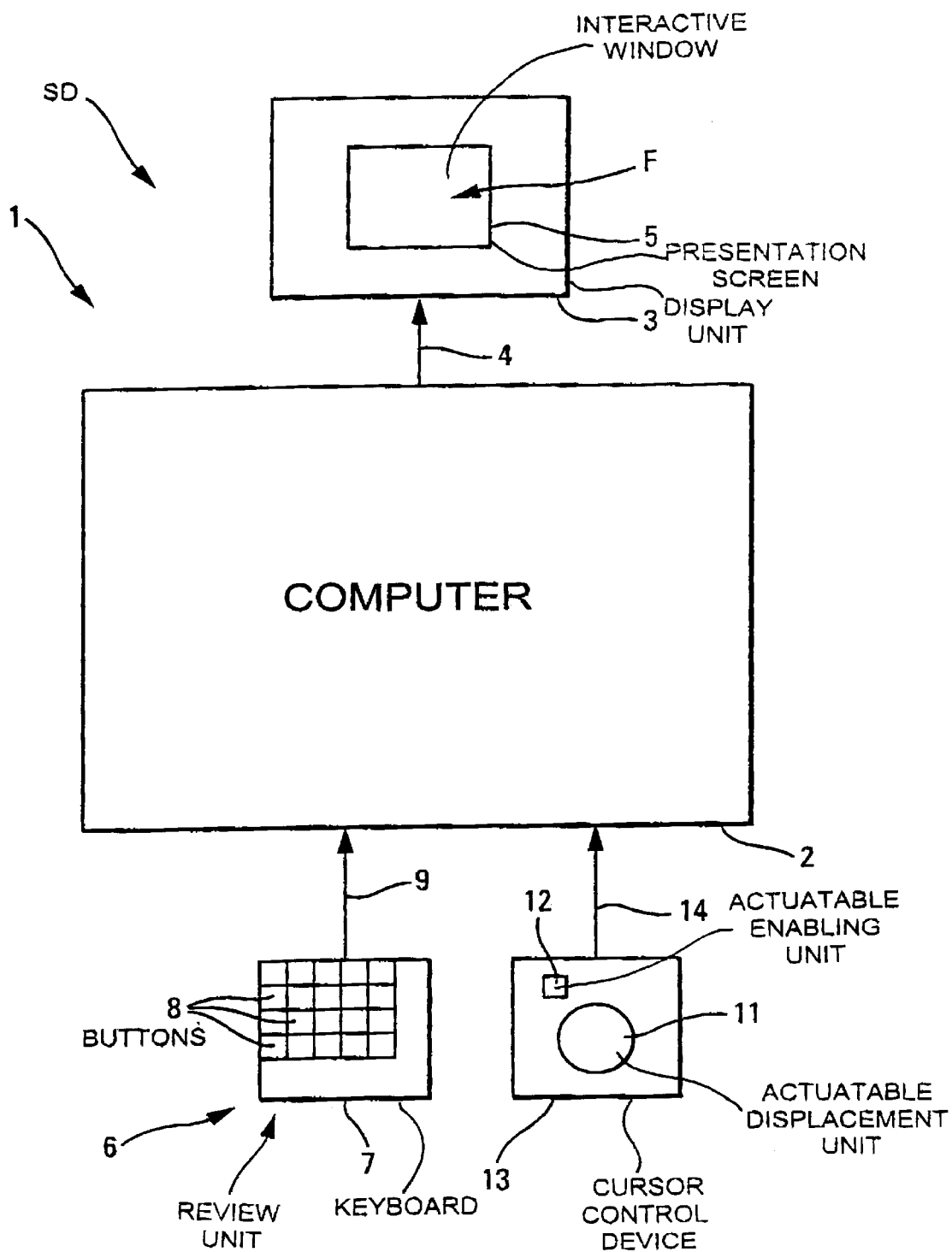

The device (1) includes display means (3) depicting, on a presentation screen (5), a flight plan page comprising a flight plan, and actuatable means of review (6) making it possible to carry out a review of said flight plan. The presentation screen (5) includes an interactive window (F) comprising responsive objects, and the flight plan page includes a characteristic sign indicating a review menu, first responsive objects provided at the level of waypoints and of the characteristic sign, the designating and the enabling of a first responsive object controlling the dropping down of a review menu, and second responsive objects associated with particular review pages and provided on the review menu when it has dropped down, the designating and the enabling of a second responsive object controlling access to the associated review page.

6 Claims, 3 Drawing Sheets

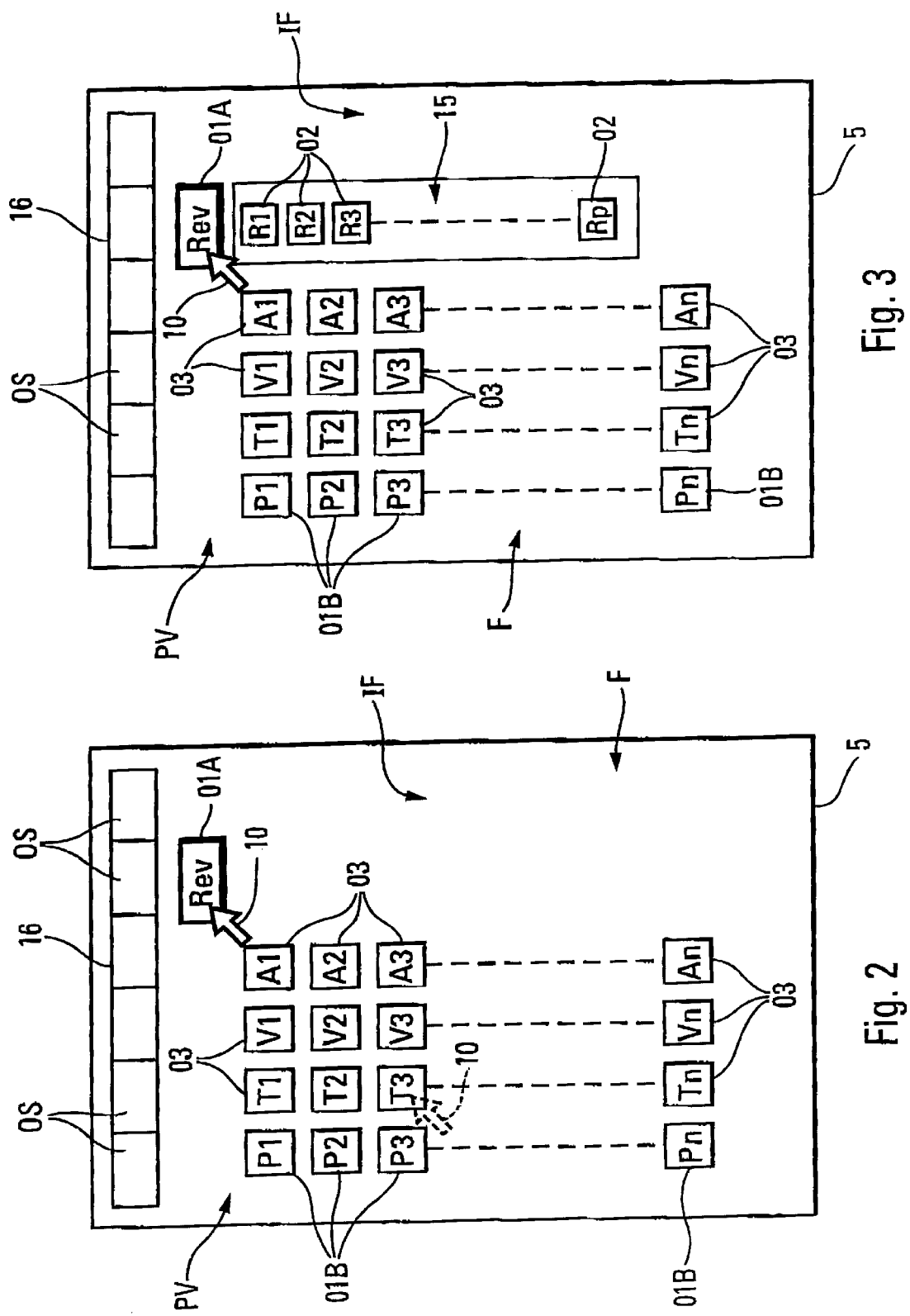

DEVICE FOR REVIEWING THE FLIGHT PLAN OF AN AIRCRAFT, IN PARTICULAR OF A TRANSPORT PLANE

The present invention relates to a device for reviewing the flight plan of an aircraft, in particular of a transport plane.

It is known that the dialog between a pilot of an aircraft and systems of said aircraft, in particular the flight management system FMS, can be carried out by way of a data display and input console MCDU ("Multipurpose Control and Display Unit").

This MCDU console is used in particular to carry out a review of the flight plan of the aircraft. For this purpose, this MCDU console includes, in particular at least:

- display means capable of depicting, on at least one presentation screen, a flight plan page comprising a flight plan which includes at least waypoints which the aircraft must overfly, information (altitude, speed, etc.) relating to these waypoints, as well as information pertaining to segments between the waypoints; and
- actuatable means of review making it possible to carry out a review of the flight plan and comprising at least:
  - first means of control making it possible to access review pages, from which reviews can be carried out; and
  - second means of control for carrying out these reviews from said review pages.

Usually, the reviewing of a flight plan can consist in deleting or adding waypoints, in modifying the position of waypoints or of characteristics (time, speed, altitude) pertaining to these waypoints or to said segments.

Generally, such an MCDU console is based, as far as the interaction with an operator is concerned, on the known so-called "line keys" technology. One is aware that with such technology, the number of possible actions starting from a page which is depicted on the presentation screen is limited to the number of line keys. Starting from a page, the commands, the data entries and the accesses to other pages, which are available by depressing a line key, are indicated on the line corresponding to the key. Access to information or to additional commands therefore makes it necessary to open a new page, replacing the previous one. Consequently, a page containing a great many commands contains little information and a page containing a great deal of information can offer only a few commands. The depicting of the information of a page is constrained by this mechanization. The number of pages is therefore very considerable and navigation between the pages demands a complex tree.

As far as the reviewing of the flight plan is concerned, with such an MCDU console, the modifications are made starting from a waypoint. The possible modifications starting from a waypoint are performed in review pages specific to each review. These review pages are accessible from two intermediate pages, one depicting the lateral reviews, the other depicting the vertical reviews.

Consequently, it is necessary to go via an intermediate page in order to access the review pages. Moreover, this is the one and only possible access to said review pages. Furthermore, said intermediate page differs depending on whether one wishes to carry out a lateral review or a vertical review.

In addition, alterations of the dialog between a pilot of an aircraft and systems of said aircraft, carried out by way of an MCDU data display and input console, are not convenient, since the introduction of new information and/or of new commands makes it very often necessary to create new pages and to change the tree of the pages.

The document FR-2 677 149 discloses a method and a device making it possible to remedy certain drawbacks of such an MCDU console, essentially as regards the reviewing of the flight plan, and more especially the following drawbacks of the MCDU console:

- the necessity to have to input characters on an alphanumeric keypad so as to modify the flight plan; and
- the fact of having to monitor two screens, namely the screen of the MCDU console which is of "head down" type and that of "head up" type of the ND display ("Navigation Display") of the flight management system, on which is represented the plot of the course of the aircraft which is formulated in a horizontal plane from waypoints which the pilot has selected during the flight preparation.

To do this, this known document FR-2 677 149 effects a coupling between the two aforesaid items of equipment, which makes it possible to obtain on a single presentation screen (the screen of the ND display), in addition to the geographical representation of the flight plan initially selected by the pilot (that is to say of the aforesaid plot of the course of the aircraft):

- a responsive zone associated with each point of the screen;
- function regions relating to four different modes of review, namely:
  - a mode for inserting a new point into the flight plan;
  - a mode for defining a point toward which the aircraft must be directed starting from its current position;
  - a mode for erasing a point; and
  - a mode for deleting a discontinuity; and
- a luminous index, whose displacements on the screen are controlled by an action of the pilot on a designating device, in such a way as to be able to bring the index onto a responsive region or a zone, the activation of the function corresponding to this region or the selection of a point of said zone being obtained by an action of the pilot on an enabling facility.

The activation of a function region makes it possible to access the review mode relating to this function region, while the activation of a responsive zone of a point of the screen makes it possible to take this point into account in the plot of the course. Thus, it is no longer necessary to input alphanumeric data to designate a waypoint and introduce it into said plot.

However, by coupling the two items of equipment ND and MCDU, it is the course plot initially presented on the display ND which is taken into account, not the flight plan of the MCDU console, to implement one of the aforesaid modes of review.

Moreover, this known device does not make it possible to access review pages. Specifically, only the four aforesaid modes of review are accessible from the first page and, moreover, access to these various modes always keeps the plot of the course on the screen so that the modes displayed do not correspond to the aforesaid usual review pages (such as they exist on the MCDU console).

The object of the present invention is to remedy these drawbacks. It relates to a device for reviewing the flight plan of an aircraft, exhibiting improved access (easier and more varied) to the review pages.

To this end, according to the invention, the device for reviewing the flight plan of an aircraft, in particular of a transport plane, said device comprising at least:

- display means capable of depicting, on at least one presentation screen, a flight plan page comprising a flight plan which includes at least waypoints which the aircraft must overfly, as well as information relating to these waypoints; and actuatable means of review making it possible to carry out a review of said flight plan and comprising at least:
first means of control making it possible to access review pages, from which reviews can be carried out; and
second means of control for carrying out these reviews from said review pages, is noteworthy in that said presentation screen includes at least one interactive window, comprising responsive objects, wherein said first means of control are formed in such a way as to be able to designate a responsive object and enable it, and wherein said display means are formed in such a way that the flight plan page which is capable of being depicted on said presentation screen furthermore includes:

at least one characteristic sign indicating a review menu;

first responsive objects which correspond to responsive objects relating to a drop-down (review) menu and which are provided at the level of said waypoints and of said characteristic sign, the designating and the enabling of one of said first responsive objects automatically controlling the dropping down, over the flight plan page, of said drop-down (review) menu; and second responsive objects which correspond to responsive objects associated respectively with particular review pages and which are provided on said review menu when it has dropped down, the designating and the enabling of one of said second responsive objects automatically controlling access to the review page which is associated with this second responsive object.

Thus, by virtue of the invention, it is possible to access the review pages both via said characteristic sign (indicating the review menu) and via said waypoints, from the flight plan page. Moreover, this access is direct, without going via an intermediate page.

Furthermore, the use of a drop-down (review) menu exhibits a dual advantage:

when it has not dropped down, its extent on the flight plan page is restricted to said characteristic sign; and when it has dropped down, it makes it possible to portray a large number of second responsive objects allowing access to the various review pages.

In addition, the device according to the invention can be readily altered by simple software modifications. Moreover, the number of different function commands from a page is not limited by hardware characteristics, such as "line keys" for example.

Within the framework of the present invention, the expression "interactive window" is understood to mean a window which comprises responsive objects (points, regions, alphanumeric values, etc.) which are associated respectively with particular functions (dropping down of a drop-down menu, appearance on the screen of a review page, etc.) and which are, preferably, responsive to the presence of a cursor. Said cursor can be displaced by an appropriate means which can be actuated by an operator of the aircraft, in such a way that it can be brought onto a responsive object so as to designate it or mark it. When a responsive object is designated, that is to say when the cursor is brought onto it, said responsive object is marked or highlighted, in particular through a change of appearance such as a change of color or increased brightness for example. Said responsive object is then said to be furnished with an "object marker" or "focus". The enabling (with the aid of an appropriate actuatable means) of a responsive object which is furnished with such an object marker triggers the execution of the function which is associated with said responsive object.

Also, in a preferred embodiment, said first means of control making it possible to access review pages, include:

at least one actuatable means of displacement, capable of displacing a cursor over said interactive window in such a way as to designate a responsive object; and at least one actuatable enabling means, capable of enabling a responsive object which is designated by way of said cursor in such a way as to cause the execution of the function which is associated with said responsive object.

Advantageously, said display means are formed in such a way:

that a review page, which is accessed by designating and enabling the first responsive object which is associated with said characteristic sign relating to the review menu, includes no preselected waypoint. Access to a review page without specifying the waypoint is sometimes beneficial in practice, in particular when the reviews are not linked with a particular waypoint; and/or that a review page, which is accessed by designating and enabling a first responsive object which is associated with a particular waypoint of said flight plan, includes a preselection of this waypoint. This makes it possible to avoid errors of selection or of entry of the waypoint.

Furthermore, advantageously, said display means are formed in such a way that the flight plan page includes, in addition, third responsive objects which are provided at the level of at least some of said information (altitude, etc.) relating to the waypoints and which correspond to responsive objects associated respectively with particular review pages from which it is possible to carry out the review of this information. Consequently, the designating and the enabling of one of said third responsive objects automatically control access to the review page from which it is possible to carry out the review of the information which is associated with this third responsive object.

Thus, an operator (pilot, copilot, etc.) can in a single action designate which type of review he wishes to undertake and to which waypoint this review is to be applied. In this case, access to the review pages does not involve the dropping down of the aforesaid drop-down menu.

By virtue of these latter characteristics (third responsive objects), the number of actions is reduced and a third manner of accessing the review pages is obtained.

In addition, advantageously, said display means are formed in such a way that the flight plan page includes, in addition, information pertaining to segments between waypoints and that the waypoints are depicted successively in one and the same direction (preferably from top to bottom) on a first column, and said information is depicted successively in the same direction (from top to bottom) on a second column.

This makes it easier to read and understand the flight plan, in particular as compared with the usual depiction which is carried out on an MCDU console where the information pertaining to a segment between two waypoints is depicted on an intermediate line between two main lines (depicting information relating respectively to these two waypoints).

The present invention also relates to an aircraft dialog system, making it possible to carry out a plurality of actions, of which one is the reviewing of the flight plan.

According to the invention, said dialog system is noteworthy in that it includes the aforesaid characteristics of the device for reviewing the flight plan and in that said display means are formed in such a way as to display on the presentation screen, permanently and independently of the page which is depicted on said presentation screen, at least one menu bar including a plurality of responsive objects respectively associated with information pages, the designating and the enabling of one of said responsive objects automatically controlling direct access to the information page which is associated with said responsive object.

This menu bar, permanent and independent of the page which is depicted, replaces the function buttons of the MCDU console, which function buttons, as is known, allow direct access to the most frequently used pages, but are limited in number.

Access via a menu bar makes it possible to dispense with this limitation and to provide for direct access to a larger number of pages. Moreover, the use of such a menu bar of software type makes it possible to alter the definition of the dialog system in accordance with the invention, by way of simple software modifications.

The figures of the appended drawing will elucidate the manner in which the invention may be embodied. In these figures, identical references designate similar elements.

FIG. 1 represents the schematic diagram of a device for reviewing the flight plan in accordance with the invention.

FIGS. 2 to 5 diagrammatically illustrate various pages which are presented on a screen of the device for reviewing the flight plan, allowing a proper explanation of the various possible accesses to the review pages, in accordance with the present invention.

The device 1 in accordance with the invention and represented diagrammatically in FIG. 1 is intended in particular for the reviewing of the flight plan of an aircraft, especially a civil transport plane, not represented.

This device 1 comprises, in the usual manner:

a computer 2;

display means 3 connected by a link 4 to said computer 2 and capable of depicting on at least one presentation screen 5 at least one flight plan page PV specified hereinbelow; and means of review 6 which can be actuated by an operator and which allow the latter to carry out a review of the flight plan.

In the usual manner, these means of review 6 comprise at least:

first means of control making it possible to access review pages, from which reviews can be carried out; and second means of control which include in particular a keypad 7 which is furnished with a plurality of buttons 8 and which is connected by a link 9 to said computer 2, so as to carry out these reviews from said review pages.

In the usual manner, a flight plan comprises, as illustrated partially in the flight plan pages PV represented in FIGS. 2 to 5, at least:

waypoints P1 to Pn;

information pertaining to said waypoints P1 to Pn, such as the time T1 to Tn, the speed V1 to Vn and the altitude A1 to An for example; and segments between the waypoints P1 to Pn, not represented, but specified hereinbelow.

Moreover, it is known that the reviewing of such a flight plan can consist, in particular, in deleting or adding waypoints P1 to Pn, in modifying the position of waypoints P1 to Pn or of characteristics (such as the time, the speed or the altitude for example) pertaining to these waypoints P1 to Pn or to said segments.

According to the invention, said screen 5, preferably an LCD liquid crystal screen includes at least one interactive window F, that is to say a window which includes responsive objects 01A, 01B, 02, 03 (regions, alphanumeric values, etc.) which are respectively associated with particular functions specified hereinbelow and which are responsive to the presence of a cursor 10. Said cursor 10 can be displaced by an appropriate means 11 specified hereinbelow which can be actuated by an operator of the aircraft, in such a way that it can be brought onto a responsive object so as to designate it or mark it. When a responsive object is designated, that is to say when the cursor 10 is brought onto it, said responsive object is marked or highlighted, in particular by a change of appearance such as a change of color or increased brightness for example. In FIGS. 2 to 5, such a change of appearance is illustrated by a thicker trace of the responsive object thus marked. Said responsive object is then said to be furnished with an "object marker" or "focus". The enabling (with the aid of an appropriate actuatable means 12) of an responsive object which is furnished with such an object marker triggers the execution of the function which is associated with said responsive object.

To do this, according to the invention, said first means of control of said means of review 6 include a cursor control device 13. This cursor control device 13 which is connected by a link 14 to the computer 2 comprises:

at least one actuatable means of displacement 11, preferably a trackball, capable of displacing the cursor 10 over said interactive window F in such a way as to designate a responsive object; and at least one actuatable enabling means 12, for example a push knob, capable of enabling a responsive object which is designated by way of said cursor 10 in such a way as to cause the execution of the function which is associated with said responsive object.

Figure 4:
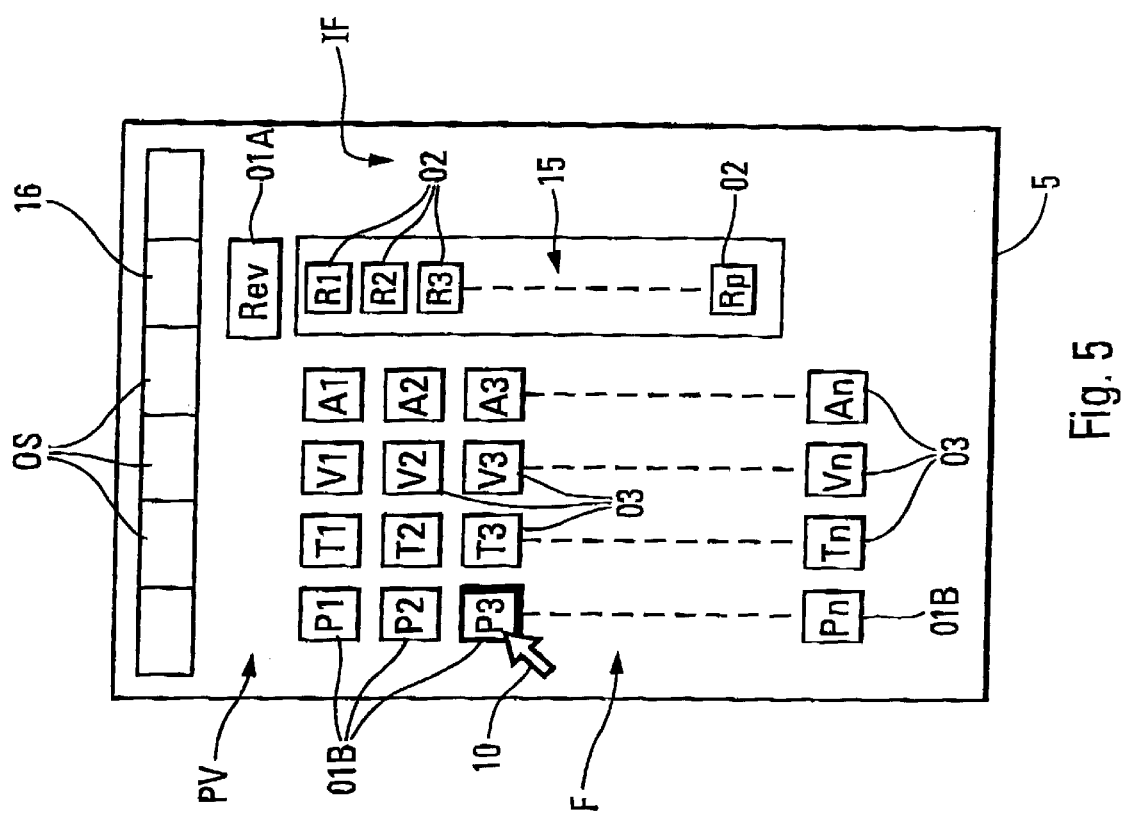
Figure 5:
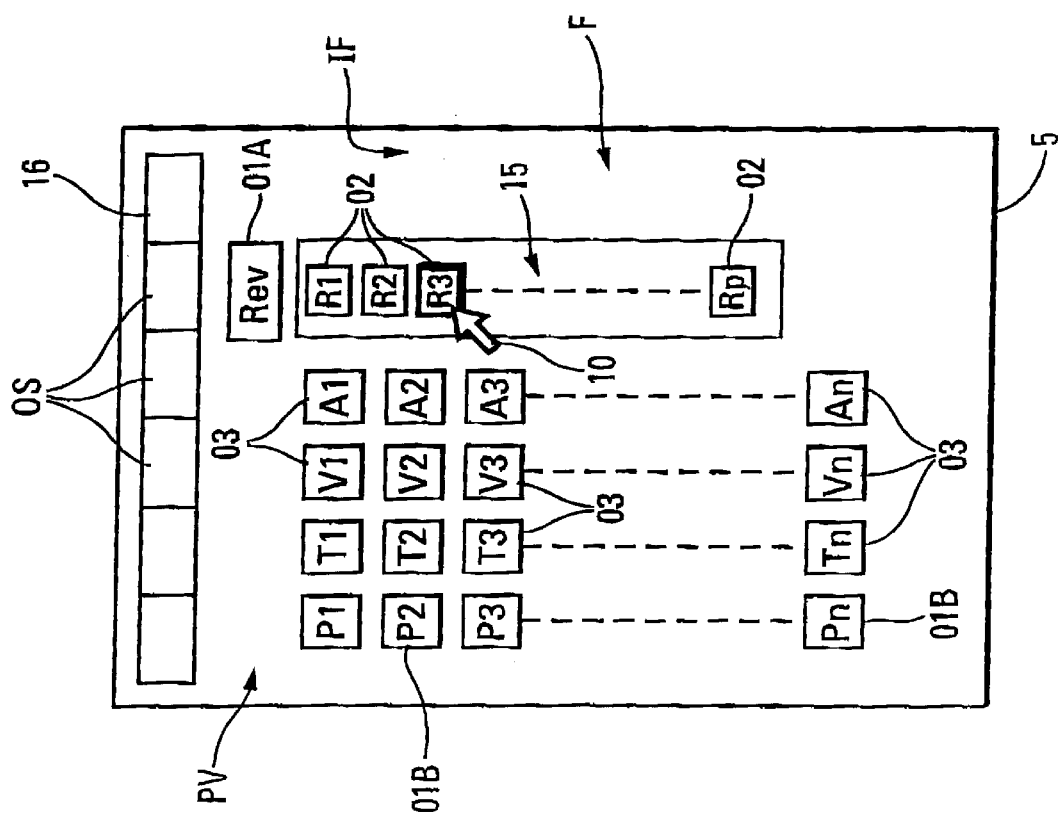

Moreover, according to the invention, said display means 3 are formed in such a way that the flight plan page PV which is capable of being depicted on said presentation screen 5 furthermore includes:

at least one characteristic sign Rev indicating a review menu;

first responsive objects 01A and 01B which correspond to responsive objects relating to a drop-down (review) menu 15 and which are provided at the level of said characteristic sign Rev for the responsive object 01A and at the level of said waypoints P1 to Pn for the responsive objects 01B. The designating and the enabling of one of said first responsive objects 01A and 01B automatically control the dropping down, over the flight plan page PV, of said drop-down (review) menu 15, as represented in FIG. 3 where the responsive object 01A has been designated and enabled; and second responsive objects 02 which are respectively associated with particular review pages and which are provided on said review menu 15 when it has dropped down, as represented in FIGS. 3 to 5. These review pages are indicated by references R1 to Rp on the drop-down review menu 15 of FIGS. 3 to 5. The designating and the enabling of one of said second responsive objects 02 automatically control access to the particular review page (R1 to Rp) which is associated with this second responsive object 02, and from which the envisaged review can be effected.

Thus, by virtue of the invention, the review pages can be accessed both via said characteristic sign Rev and via said waypoints P1 to Pn, from the flight plan page PV. Moreover, this access is direct, without involving an intermediate page.

Furthermore, the use of a drop-down (review) menu 15 exhibits a dual advantage:

when it has not dropped down, its extent on the flight plan page PV is restricted to said characteristic sign Rev (FIG. 2); and when it has dropped down, it makes it possible to portray a large number of second responsive objects R1 to Rp, permitting access to the review pages (FIGS. 3 to 5).

Additionally, the device 1 in accordance with the invention is easily altered through simple software modifications. Moreover, the number of different function commands from a page is not limited by hardware characteristics, such as "line keys" for example.

Access to the review pages (not represented) on the basis of the characteristic sign Rev is illustrated in FIGS. 2, 3 and 4, while access on the basis of a waypoint is illustrated in FIGS. 5 and 4. Specifically:

on the flight plan page PV shown in FIG. 2, the cursor 10 is brought, by way of the means of displacement 11, onto the responsive object 01A situated at the level of the characteristic sign Rev (indicating the review menu) in such a way as to designate this responsive object 01A;

from this position, an enabling of this responsive object 01A, by way of the enabling means 12, causes the dropping down of the drop-down review menu 15 and the appearance of the second responsive objects 02 at the level of indications R1 to Rp relating to various review pages, as is represented in FIG. 3; and when the review menu 15 has dropped down, one of said second responsive objects 02 can be designated and enabled, as is illustrated in respect of the responsive object associated with the review page R3 in FIG. 4, this then causing the appearance of the corresponding review page (not represented) on the screen 5, from which the envisaged review can be carried out in the usual manner.

Furthermore, represented in FIG. 5 is the designating and the enabling of the responsive object 01B associated with the waypoint P3 which causes the dropping down of the review menu 15. Thereupon, a second responsive object 02 can be designated and enabled, as is illustrated in FIG. 4 and indicated previously.

When a review page is accessed on the basis of the characteristic sign Rev, no waypoint is preselected (that is to say selected by default). Such access is beneficial, since the reviews are sometimes not linked to a particular waypoint.

On the other hand, when a review page is accessed on the basis of a particular waypoint P1 to Pn, this waypoint is selected by default in the review page. Of course, this waypoint can be changed if necessary. Such access is also beneficial, since it avoids errors of selection or of entry of the waypoint.

According to the invention, the flight plan page PV includes, in addition, third responsive objects 03 which are provided at the level of at least some of said information T1 to Tn, V1 to Vn, A1 to An relating to the waypoints P1 to Pn and which correspond to responsive objects associated respectively with particular review pages from which it is possible to directly carry out the review of this information T1 to Tn, V1 to Vn or A1 to An. The designating and the enabling of one of said third responsive objects 03, as is represented by way of illustration with the dashed cursor 10 which in FIG. 2 designates the responsive object 03 relating to the information item T3, automatically control access to the review page from which it is possible to carry out the review of the information item (T3) which is associated with this third responsive object 03.

Thus, an operator (pilot, copilot, etc.) can in a single action designate which type of review he wishes to undertake (review of the time for the information item T3) and to which waypoint this review is to be applied (waypoint P3 for the information item T3). This particular access to the review pages does not therefore involve the dropping down of the drop-down menu 15.

Consequently, the number of actions is reduced and a third way of accessing the review pages is obtained. Additionally, the flight plan page PV includes, in addition, information IF pertaining to segments between waypoints P1 to Pn. Moreover, the waypoints P1 to Pn are depicted successively in one and the same direction, preferably from top to bottom, on a column, as represented in FIGS. 2 to 5, and said information IF is depicted successively in the same direction (from top to bottom) on another column, not represented and situated on the right of the drop-down menu 15 in FIGS. 2 to 5.

These columns may be arranged on either side of a vertical schematic (not represented).

This aids the reading and the understanding of the flight plan, in particular with respect to the usual depiction on an MCDU console, where the information regarding a segment between two waypoints is depicted on an intermediate line, between two main lines which depict information relating to these two waypoints respectively.

The device 1 in accordance with the invention need not be limited solely to the reviewing of the flight plan, but may be broadened to a dialog system SD making it possible to carry out under the control of an operator a plurality of actions, of which one is said reviewing of the flight plan.

In this case, preferably, said computer 2 and said display means 3 are formed in such a way as to display on the presentation screen 5, permanently and independently of the page which is depicted on said presentation screen 5, at least one menu bar 16 including a plurality of responsive objects OS associated respectively with information pages, such as the flight plan page PV for example. The designating and enabling of one of said responsive objects OS automatically control direct access to the information page which is associated with said responsive object OS.

This menu bar 16, permanent and independent of the page which is depicted on the screen 5, replaces the function buttons of the MCDU console, which allow direct access to the most frequently used pages, but which are limited in number.

Access via a menu bar 16 makes it possible to dispense with this limitation and to provide for direct access to a larger number of pages. Moreover, the use of such a menu bar 16 of software type makes it possible to alter the definition of the system SD in accordance with the invention, by way of simple software modifications.

The dialog system SD in accordance with the invention moreover makes it possible to replace an MCDU console and to remedy some of its drawbacks. In particular:

A/ It is known that the number of possible actions from an MCDU page is limited to the number of "line keys". Starting from a page, the commands, the data entries and accesses to other pages, which are available by depressing a line key, are designated on the line corresponding to the key. Access to information or to additional commands requires the opening of a new page, replacing the previous one. A page containing a great many commands consequently contains little information and a page containing a great deal of information can offer only a few commands. The depicting of the information of a page is constrained by this mechanization. The number of pages is therefore very considerable and navigation between the pages demands a complex tree.

The replacement of the line keys by responsive objects (01A, 01B, 02, 03), in accordance with the present invention, makes it possible to dispense with these constraints.

Specifically, by designating and selecting responsive objects, the pilot can then:

execute a system command;

enter data;

access other pages; and access information and additional actions without changing page.

Within one and the same page, the number of commands is therefore less limited. Their location can be chosen anywhere on the screen 5. The layout of the information and of the commands in the various pages is no longer constrained by the hardware characteristics of the interface and is therefore rather more guided by operational and functional criteria.

Moreover, a use of tabpanels makes it possible to offer access to other pages, whilst displaying the information of the current page.

This graphical object adapts very well to the organization of the information:

based on flight phase (PERF pages for example);

based on type of information (access to the navigation database);

based on type of command (access to various reviews of the flight plan).

This entire mechanization makes it possible to limit the number of pages in the interface and to simplify the hierarchy thereof. The storing of the hierarchy of the dialog pages by the pilots is thus aided and the learning of the interface is reduced.

B/ On an MCDU console, the arrangement of the information is constrained by a matrix partitioning of the screen, the presence of "line keys" and the exclusive use of alphanumeric characters.

The use in accordance with the invention of graphics interfaces and the degrees of freedom in the position of the responsive objects on the presentation screen 5 makes it possible to convey more meaning through the arrangement of the information on said presentation screen 5.

The arrangement of the information and the use of diagrams, schematics and graphics make it possible to depict this information in accordance with the usual mental diagrams of pilots.

Moreover, the arrangement of the information is more easily correlated with the representation which the pilot effects of the aircraft in its environment. This arrangement may also be consistent with other forms of presentation usually available to the pilot (Navigation Display, paper documentation).

Furthermore, the use of diagrams and of schematics makes it possible to guide the assimilation of the information. For example, the information can be depicted by a diagram siting the aircraft in a plane of its flight path.

C/ It is known that the reaction time of the crew of an aircraft to a given situation is an important criterion in the quality and safety of the piloting task. The efficiency of assimilation of the situation is then paramount.

On an MCDU console, any item of information is transmitted to the crew in alphanumeric form. The pilot must therefore read values, read states so as to assimilate the situation of the aircraft or systems which advise him as to the situation of the aircraft. Such is the case in particular in respect of the aircraft position information.

On the dialog system SD in accordance with the invention, graphical representations allow the pilots to immediately digest the information necessary for the understanding of the situation. For example, a numerical value can be represented by a needle of a dial, a cursor on a bar, a colored infill of a bar, or any other suitable and intuitive graphical representation.

What is claimed is:

1. A device mounted on an aircraft, in particular a transport plane, for enabling a pilot or other operator of the aircraft to review during flight the flight plan of the aircraft, said device including:

display means including at least one presentation screen for depicting a flight plan page comprising a flight plan which includes at least waypoints which the aircraft is to overfly, as well as information relating to said waypoints; and actuatable means operable by said pilot or other operator to carry out a review of said flight plan and comprising at least:

first control means to enable said pilot or other operator to access review pages, to enable reviews of said flight plan to be carried out; and second control means for carrying out said reviews from said review pages, wherein:

said presentation screen includes at least one interactive window comprising plural responsive objects, said first control means provide for designation and enablement of a responsive object of said plural responsive objects, and said display means display, with respect to the flight plan depicted on said display screen:

at least one characteristic sign indicating a review menu;

first responsive objects of said plural responsive objects, said first responsive objects relating to a drop-down review menu and being provided at the level of said waypoints and said characteristic sign, the designation and enablement by said first control means of one of said first responsive objects automatically controlling the dropping down, over the flight plan page, of said drop-down review menu; and second responsive objects of said plural responsive objects, said second responsive objects being associated respectively with particular ones of said review pages and being provided on said review menu when said review menu has dropped down, the designation and enablement by said first control means of one of said second responsive objects automatically controlling access to the one of said review pages which is associated with said one of said second responsive objects, and wherein:

said display means displays the flight plan page to include, in addition, information pertaining to segments between waypoints, displays the waypoints successively in one and the same direction on a first column, and displays said information successively in the same direction on a second column.

2. The device as claimed in claim 1, wherein said display means displays one of said review pages, said one of said review pages being accessed by designation and enablement by said first control means of the one of said first responsive objects which is associated with said characteristic sign indicating the review menu, so as to include no preselected waypoint.

3. The device as claimed in claim 1, wherein said display means displays one of said review pages, which is accessed by designation and enablement by said first control means of one of said first responsive objects which is associated with a particular waypoint of said flight plan, so as to include a preselection of said particular waypoint.

4. The device as claimed in claim 1, wherein said display means displays the flight plan page to include, in addition, third responsive objects of said plural responsive objects, said third responsive objects being provided at the level of at least some of said information relating to the waypoints and corresponding to responsive objects associated respectively with particular review pages which enable carrying out the review of said information relating to the waypoints, the designation and enablement by said first control means of one of said third responsive objects automatically controlling access to the one of said particular review pages which enables carrying out the review of the information which is associated with said one of said third responsive objects.

5. The device as claimed in claim 1, wherein said first control means include:

at least one actuatable means for displacing a cursor over said interactive window in such a way as to designate one of said responsive objects; and at least one actuatable enabling means for enabling said one of said responsive objects which is designated by way of said cursor in such a way as to cause execution of a function which is associated with said one of said responsive objects.

6. A dialog system mounted on an aircraft, for enabling a pilot or other onboard operator of the aircraft to carry out during flight a plurality of actions relating to flying of the aircraft, said actions including review of the flight plan, said system including said device for reviewing the flight plan specified in claim 1, and wherein said display means display on the presentation screen, permanently and independently of the one of said review pages which is depicted on said presentation screen, at least one menu bar including at least some of said plural responsive objects that are respectively associated with information pages, designation and enablement of one of said at least some of said plural responsive objects automatically controlling direct access to the information page which is associated with said one of said at least some of said plural responsive objects.

* * * * *